Patented Sept. 4, 1945

2,384,118

UNITED STATES PATENT OFFICE 2,384,118

COMPOSITION OF MATTER

Irving E. Muskat and Franklin Strain, Akron, Ohio, assignors to Pittsburgh Plate Glass Company, Allegheny County, Pa., a corporation of Pennsylvania No Drawing. Application May 6, 1941,
Serial No. 392,102

6 Claims. (Cl. 260—463)

This invention is a continuation-in-part of copending application Serial No. 361,280, filed October 15, 1940.

The invention relates to new compositions of matter, polymers of such compositions and to methods of producing them. The compounds are esters of carbonic acid and lactic acid in which one of the acid groups of the carbonic acid is esterified with the hydroxy group of the lactic acid. The remaining acid group of the carbonic acid and the carboxyl group of the lactic acid are both esterified with alcohols. These two acid groups may be esterified with the same alcohols or each may be esterified with a different alcohol.

The invention is particularly related to the esters of unsaturated alcohols which contain an unsaturated group in an aliphatic chain and not in excess of 10 carbon atoms such as vinyl, allyl, isopropenyl, or other propenyl esters, methallyl, methyl vinyl carbinyl or crotyl or other butenyl ester or α or β ethyl allyl or other pentenyl ester or the esters of other alcohols including tiglyl, butadienyl, propargyl, cinnamyl, angelyl, linalyl or geranyl alcohols or halogenated alcohols such as 2-chloroallyl or chlorocrotyl alcohols, etc. Of particular interest are the esters of alcohols containing up to 5 carbon atoms such as the vinyl, propenyl, butenyl and pentenyl esters.

The vinyl ester may be prepared by methods other than by the direct esterification of the acid with alcohol. Thus, the vinyl ester may be prepared from vinyl lactate which in turn may be prepared from the reaction of acetylene with lactic acid.

The compounds herein contemplated apparently have the following general formula:

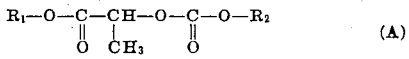

in which $R_1$ or $R_2$ may be unsaturated radicals of the alcohols enumerated above.

These new compositions are in some instances solids at room temperatures and in other cases, they are liquids with high-boiling points.

The materials herein contemplated may be prepared by reaction of a suitable chloroformate, with an ester of lactic acid. In accordance with a suitable method, the chloroformate may be added slowly to an unsaturated lactate such as allyl, vinyl, propargyl, methallyl, butenyl, butadienyl, etc., lactates in the presence of a suitable basic agent such as pyridine, quinoline, and the carbonates, hydroxides and bicarbonates of calcium, magnesium, sodium, potassium, barium and strontium. Polymerization inhibitors such as hydroquinone may be added, if required to prevent polymerization. When allyl lactate is so treated with methallyl chloroformate, a product of the following structure is obtained:

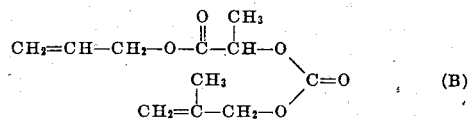

Similar compounds are obtained by treatment of the lactic ester with allyl, crotyl, butadienyl, pentenyl, or other chloroformate or haloformate in the presence of an alkaline agent. In accordance with a further modification, lactic acid or an ester thereof may be treated with phosgene to form a chloroformate and thereafter, the resulting product may be treated with allyl, methallyl, or other unsaturated alcohol in the presence of a basic agent.

The temperature of the reaction will depend upon the nature of the alkaline reagent used. When pyridine or caustic soda is used, temperatures less than normal room temperature (15 to 25° C.) may be used. The lower temperatures generally favor higher yields. When calcium carbonate is used as the alkaline reagent, it is desirable to operate at higher temperatures, preferably about 50° C. The effect of reduced yields can be compensation by controlling the concentration of reactants. Thus, by using an excess of both alcohol (or hydroxy acid or ester thereof) and alkaline reagent, almost quantitative yields can be obtained in many cases. When operating under such circumstances, the excess of reagents may be recovered and used in subsequent preparations.

The compositions herein described vary from high boiling point liquids to solids. Many of the liquids are very clear and colorless and are miscible with numerous organic solvents such as acetone, alcohol, chloroform, dioxane, benzene, xylene, toluene, ethyl ether, paraffin, hydrocarbons, etc.

These compositions may be used for many purposes such as solvents, paint compositions, pharmaceuticals, plasticizers, etc., for various materials such as cellulose, vinyl, phenol, urea, acrylic, or styrene resins or plastics. Many of these compounds, particularly the polyunsaturated esters, polymerize in the presence of catalysts such as heat, light, oxygen, ozone, peroxides, such as benzoyl or lauryl peroxide, etc. In most cases where the mono-unsaturated esters polymerize, the polymers thereof are fusible and soluble in common organic solvents and often these materials polymerize only with difficulty, forming viscous oils or soft solids. By polymerization of the polyunsaturated esters, however, it is possible to secure a wide range of polymers, some of which are extremely hard, while others are soft, flexible and often rubber-like in character. In general, the polymers thus obtained are transparent and colorless, although the polymer occasionally may be slightly yellow. If desired, the compounds herein described may be cast polymerized to form products having various shapes. These polymers in their finally cured state are substantially infusible and insoluble and in general, are substantially unaffected by acids, alkalies, water or organic solvents. Many of the products obtained by polymerization of the materials herein contemplated are tougher and more resistant to shattering than are many of the polymers of allyl esters of polybasic acids.

In accordance with the present invention, intermediate polymers of the polyunsaturated esters may be prepared. These intermediate products may be soluble and fusible, or if desired, intermediate polymers having a gel-like structure and containing more or less insoluble polymer may be secured. These polymers may be obtained by interrupting polymerization at the proper time.

In general, the fusible soluble polymers are soluble in various organic solvents such as acetone, carbon tetrachloride, benzene, xylene, toluene, dioxane, etc. Both types of these intermediate polymers may be further polymerized to an infusible state to form products similar to the infusible polymers mentioned above. Thus, these fusible polymers may be molded or otherwise shaped and polymerized by means of heat and/or light to form shaped products which are substantially infusible and insoluble and which retain their shape permanently.

The soluble fusible polymers herein described may be prepared by polymerizing the unsaturated compounds which contain at least two polymerizable unsaturated groups until substantial polymerization has occurred and interrupting polymerization before the polymer is converted into an infusible polymer, preferably while the polymer remains viscous. It is found that when polymerization of these materials is initiated, a fusible polymer is preliminarily formed. As polymerization proceeds, the monomer-polymer mixture is converted into a gel which contains a substantial portion of insoluble polymer. Upon further polymerization of the gel it is further converted to a tougher, more abrasion-resistant polymer which may, in some cases, be substantially infusible. By interrupting polymerization before the polymer is converted to a gel and while the polymer is viscous, it is possible to obtain a fusible polymer. This interruption may be effected by cooling, addition of inhibitors, or by other methods. If desired, the fusible polymer may be recovered substantially free from monomer or at least as a concentrate containing substantially less monomer than is present in the monomer-polymer mixture formed by ordinary polymerization of undiluted monomer.

The fusible polymer may be obtained by polymerization of the monomeric compound or a solution thereof. In general, it is possible to secure the fusible material in superior yields by polymerizing the monomer in a solution in which the fusible polymer is normally soluble and interrupting polymerization before the polymer is converted into a gel. This polymer is generally soluble in the solvents which are capable of dissolving the usual thermoplastic vinyl or acrylic resins such as polymethyl methacrylate or polyvinyl acetate. Thus, such solvents as acetone, dioxane, chloroform, toluene, benzene, carbon tetrachloride, methyl Cellosolve acetate, phenyl Cellosolve, dichlorethylether, xylene, tetralin, dibutyl phthalate, trichloroethylene, tetrachlorethane, etc., or mixtures of these solvents generally are found to be suitable. Solutions having concentrations of 10 to 60 percent of monomer yield very satisfactory results.

In any case the polymerization may be interrupted before the infusible product is produced. This may be accomplished by stopping polymerization as the mixture of monomer and polymer begins to grow viscous and before gel formation occurs. In accordance with one illustrative method of interrupting polymerization, the polymer may be separated from the monomer by convenient methods, for example, by the addition of a compound in which the polymers are normally insoluble, such as methyl or ethyl alcohol, petroleum ether, water, ethylene glycol, etc. This process permits the isolation of the fusible polymer in a substantially pure state and is particularly adapted to use when the materials are polymerized in solution. Polymerization may also be halted by lowering the temperature of the reaction mixture to a suitable degree, for example, to room temperature or below. In accordance with another effective method of interrupting polymerization, inhibitors such as pyrogallol, hydroquinone, aniline, phenylene diamine or sulphur may be added to the polymer during polymerization or before polymerization has been initiated.

In polymerization of the compounds herein contemplated, the time required in order to initiate polymerization and to secure a fusible polymer varies widely in view of slight traces of peroxides or inhibitors which may be present. For this reason, the viscosity of the composition undergoing polymerization is observed and, in general, polymerization is interrupted after the viscosity of the composition has approximately doubled. In many cases, subjection of the compound to polymerization conditions for a period of one-half to two hours is sufficient, although some compounds polymerize somewhat more slowly.

The fusible polymer produced by polymerization of diluted or undiluted monomer may be molded or cast to any desired shape and subsequently cured to the infusible state. In treating many of the materials, however, it is found that if considerable monomer is retained in the polymer, considerable difficulty may be encountered upon curing, in securing complete, or substantially complete polymerization of the residual monomer without formation of undesirable soft products or of products containing cracks, bubbles, and other defects, accordingly, we have found that in many cases it is desirable to remove all or a portion of such monomer from the polymer prior to curing the polymer to its infusible state. In accordance with one convenient method, the polymer may be separated by addition of a nonsolvent such as water, ethyl or methyl alcohol, glycol, etc. Alternatively, the monomer and/or solvent may be distilled from the polymer under conditions whereby further polymerization is minimized, for example, by distillation in a vacuum, preferably at low temperatures, and/or in the presence of added inhibitors. When the polymer is semi-solid or solid, the product may be dispersed, or extracted, with a suitable solvent for the monomer in which the polymer is insoluble, such as methyl or ethyl alcohol. Additionally, the polymer and monomer may be separated by dissolving the product in a solvent for both monomer and polymer and adding a non-solvent to precipitate the fusible polymer.

As previously noted, we have found that upon subjection of these fusible polymers to heating at temperatures somewhat above the softening point thereof, for a sufficient period of time, they are converted into an infusible, insoluble and transparent, hard and wear-resistant product. This conversion is preferably assisted by the incorporation of usual polymerization catalysts, such as oxygen, ozone, air, peroxides such as hydrogen peroxide, benzyl or lauryl peroxide, or other oxygen catalyst, basic or acidic catalyst, light, etc.

The resins herein contemplated are capable of use in many fields. Thus, the monomer syrupy polymer or fusible polymer may be used for coating or impregation of wood, paper, cloth, or other fibrous products and in the production of laminated resinous products. Likewise, shaped products of high transparency may be secured by molding and polymerizing the fusible polymer or by cast polymerizing the monomer or syrupy polymer.

The following examples are illustrative:

Example I 36 moles of phosgene were passed through 40 moles of allyl alcohol. The reaction mass was stirred constantly and maintained between the temperatures of 15 and 25° C. The reaction product was washed in cold water, dried over anhydrous calcium chloride, and purified by distillation. The allyl chloroformate boiled at 46.51° C. at 80 mm. pressure and had a density $(d_4^{20})$ of 1.136.

365 parts by weight of allyl chloroformate was added, over a period of two and one-half hours, to 357 parts by weight of allyl lactate dispersed in 268 cc. of pyridine with stirring at a temperature maintained between 2 and 18° C. The reaction mixture was acidified to the methyl orange endpoint, washed with water, dilute HCl, dilute $Na_2CO_3$ solution, and finally again with water. The new compound was dried over anhydrous sodium carbonate and purified by distillation. The product, an ester of allyl acid carbonate and allyl lactate, boiled at 112° C. at 2 mm. of pressure, had an index of refraction $(N_D^{20})$ of 1.438 and a density $(d_4^{20})$ of 1.064. The formula of this compound probably is as follows:

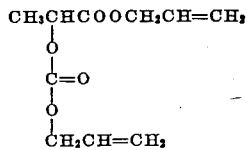

Example II

The ester of allyl acid carbonate and allyl lactate was polymerized to the fusible state by heating over an oil bath at a temperature of 150° C. while bubbling a stream of air through the monomer. After about 3 hours the viscosity of the polymerizing ester had increased appreciably. The fusible polymer was then precipitated by adding methanol and recovered. The fusible polymer was mixed with one percent benzoyl peroxide and molded in a press under 2000 pounds per square inch pressure for 30 minutes at a temperature of 145° C. The resulting product was a colorless solid resin.

Example III

The chloroformate of allyl lactate was prepared by passing phosgene through allyl lactate in the manner described in Example I for the preparation of methallyl chloroformate. One mole of this product was then added slowly to a mixture of 1.1 moles of methallyl alcohol and 1.3 moles of pyridine while vigorously agitating the mixture and maintaining the temperature at about 5 to 15°. The product was washed and recovered as in Example I.

Example IV

The ester of allyl acid carbonate and allyl lactate was mixed with 5 percent benzoyl peroxide and polymerized to the fusible polymer state by heating at 85° C. for 80 minutes. A 100 percent increase was noted in the viscosity. The fusible polymer was precipitated with methyl alcohol and recovered. A sample of the fusible polymer thus prepared was mixed with 5 percent benzoyl peroxide and pressed in a mold at 145° C. at 2000 pounds per square inch pressure. A transparent and nearly colorless resin was obtained.

Example V

Methallyl chloroformate was prepared by passing 20 moles of phosgene into 24 moles of methallyl alcohol. The reaction mass was continually agitated and maintained at a temperature between 0–15° C. The product was washed free of alcohol and dried. The methallyl chloroformate boiled at 126–136° C. at atmospheric pressure, had an index of refraction $N_D^{20}=1.427$ and a density $d_4^{20}$ of 1.070.

453 gms. of methallyl lactate was mixed with 298 gms. of pyridine in a reaction vessel equipped with a stirring device. To this, 464 gms. of methallyl chloroformate were slowly added while the reaction mass was maintained between 10 and 20° C. The product was washed with water and heated at 95–100° C. in the presence of activated charcoal and at a total pressure of 15–20 mm. whereby most of the impurities were removed. After the carbon was removed by filtration the methallyl acid carbonate ester of methallyl lactate was obtained as a clear colorless liquid having a density $(d_4^{20})$ of 1.058 and an index of refraction $(N_D^{20})$ of 1.455. This compound has the following probable formula:

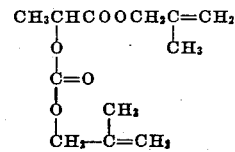

The compound may be polymerized in accordance with the procedure described in Examples II and III.

In accordance with a further modification of the invention, the groups $R_1$ and $R_2$ may contain ether linkages. Thus, hydroxy-ethers such as ethyl Cellosolve, allyl Cellosolve, 2-hydroxy-ethyl o-chlorophenyl ether, ethylene glycol monomethyl ether, methyl-2-hydroxy ethyl ether and other ethers having substituted hydroxy groups, may be used to esterify the lactic acid to produce compounds of the following nature:

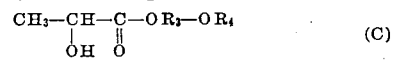

in which $R_3$ and $R_4$ may be either saturated or unsaturated organic radicals including halogen or other substituted hydrocarbon groups depending upon the selection of the hydroxy ether. This compound may be reacted with a chloroformate of either an unsaturated or a saturated alcohol and useful compounds will be obtained having the formula

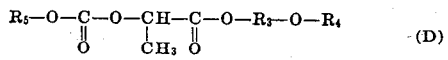
$$R_5-O-C-O-CH-C-O-R_3-O-R_4 \quad (D)$$
with $\|O\|$ and $CH_3$ and $\|O\|$ By preparing a chloroformate of an hydroxy ether such as Cellosolve or allyl Cellosolve, reacting it with a lactic acid ester, it is possible to produce compounds having the following structure:

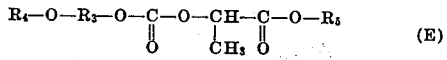
$$R_4-O-R_3-O-C-O-CH-C-O-R_5 \quad (E)$$

In accordance with a further modification, the chloroformates of the hydroxy ether may be reacted with the lactates represented by Formula C. The following composition may be produced:

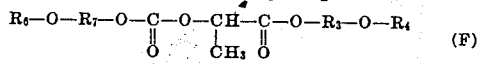
$$R_5-O-R_7-O-C-O-CH-C-O-R_3-O-R_4 \quad (F)$$

in which $R_3$, $R_4$, $R_5$ and $R_7$ may be either saturated or unsaturated organic radicals.

A further embodiment of this invention involves the esters derived from mono or polyesters of lactic acid and polyhydric compounds such as glycol, diethylene glycol, triethylene glycol, tetraethylene glycol, glycerol, erythritol, pentanols, phthalyl alcohol, etc., or with partial esters of such alcohols as glycol mono acrylate, monomethacrylate, monoacetate, etc., or with partial esters of such alcohols as glycol or other polyhydroxy compounds with other polybasic acids and/or esters thereof such as a glycol monoester of allyl chloroformate.

These compounds may be prepared by reacting the desired chloroformate with lactic acid and treating the resulting compositions with sufficient polyhydric compound or partial ester thereof to esterify the carboxyl group of the lactic acid, whereby a compound of the following general formula is obtained:

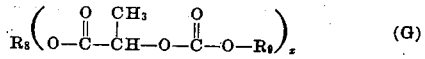
$$R_8\left(O-C-CH-O-C-O-R_9\right)_x \quad (G)$$

in which $R_8$ is an organic radical and $x$ is a small whole number and $R_9$ is either a saturated or unsaturated organic radical such as a hydrocarbon or substituted hydrocarbon group.

Other compounds can be prepared by coupling the acid groups of the carbonic acid through the hydroxy groups of the polyhydric alcohol. This is done by esterifying the lactic acid with either a saturated or an unsaturated alcohol, and reacting the resulting ester with a chloroformate of a polyhydric alcohol such as glycol dichloroformate. One mole of a polyhydric alcohol having $x$ hydroxy groups reacts with $x$ moles of the chloroformate to produce a compound having the general formula:

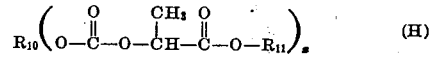
$$R_{10}\left(O-C-O-CH-C-O-R_{11}\right)_x \quad (H)$$

in which $R_{10}$ is an organic radical and $R_{11}$ is either an unsaturated or a saturated organic radical, and $x$ is a whole number.

Although the present invention has been described with reference to specific examples, it is not intended that the scope of the invention shall be limited thereby, except as limited by the following claims. This invention is a continuation-in-part of copending application Serial No. 361,280, filed October 15, 1940.

We claim:

1. A neutral ester of (A) an ester of an unsaturated monohydric alcohol and lactic acid and (B) a partial ester of carbonic acid and an unsaturated monohydric alcohol, said unsaturated alcohols having up to ten carbon atoms and an unsaturated linkage in an aliphatic straight chain.

2. The compound of claim 1 in which the two unsaturated alcohol radicals are identical.

3. The compound of claim 1 in which one of the unsaturated alcohols is allyl alcohol.

4. A neutral ester of (a) methallyl lactate and (b) allyl acid carbonate.

5. An ester of (a) allyl lactate and (b) allyl acid carbonate.

6. An ester of (a) methallyl lactate and (b) methallyl acid carbonate.

IRVING E. MUSKAT.
FRANKLIN STRAIN.